United States Patent
Jeong et al.

[19]

[11] Patent Number: 6,144,242
[45] Date of Patent: Nov. 7, 2000

[54] CONTROLLABLE DELAYS IN MULTIPLE SYNCHRONIZED SIGNALS FOR REDUCED ELECTROMAGNETIC INTERFERENCE AT PEAK FREQUENCIES

[75] Inventors: Deog-Kyoon Jeong, Seoul, Rep. of Korea; Gyudong Kim, Sunnyvale; David D. Lee, Palo Alto, both of Calif.

[73] Assignee: Silicon Image, Inc., Sunnyvale, Calif.

[21] Appl. No.: 09/148,815

[22] Filed: Sep. 4, 1998

Related U.S. Application Data

[60] Provisional application No. 60/058,041, Sep. 4, 1997.

[51] Int. Cl.[7] .................................................. H03H 11/26
[52] U.S. Cl. ...................... 327/269; 327/270; 327/291; 327/296; 331/57
[58] Field of Search ................................. 327/269, 270, 327/291, 296; 331/57

[56] References Cited

U.S. PATENT DOCUMENTS

| | | | |
|---|---|---|---|
| 5,132,633 | 7/1992 | Wong | 328/14 |
| 5,383,143 | 1/1995 | Crouch | 364/717 |
| 5,442,636 | 8/1995 | Bontekoe | 370/108 |
| 5,446,418 | 8/1995 | Hara | 331/57 |
| 5,479,129 | 12/1995 | Fernandez et al. | 327/276 |
| 5,600,273 | 2/1997 | Hall et al. | 327/261 |
| 5,675,832 | 10/1997 | Ikami et al. | 395/835 |
| 5,844,447 | 12/1998 | Choi | 331/57 |
| 5,930,197 | 7/1999 | Ishibashi | 365/233 |

FOREIGN PATENT DOCUMENTS 0 620 518 A1  10/1994  European Pat. Off. .......... G06F 7/58

OTHER PUBLICATIONS

Frequency Modulation Of System Clocks For EMI Reduction, Cornelis D. Hoekstra, Hewlett–Packard Journal, Aug., 1997 Article 13 pp. 1–7.

*Primary Examiner*—Margaret R. Wambach
*Assistant Examiner*—Cassandra Cox
*Attorney, Agent, or Firm*—Fenwickk & West LLP

[57] ABSTRACT

Multiple controllable delays reduce EMI radiated during the transmission of multiple synchronized signals. Each controllable delay introduces a controlled delay into a corresponding signal being transmitted. The controlled delay is such that the combined strength of the multiple signals at peak frequencies is substantially reduced. This results in reduced EMI radiation at those peak frequencies.

10 Claims, 8 Drawing Sheets

FIG. 5A
302A
(odd number of inverters in loop)

CONTROLLABLE DELAYS IN MULTIPLE SYNCHRONIZED SIGNALS FOR REDUCED ELECTROMAGNETIC INTERFERENCE AT PEAK FREQUENCIES

This application claims benefit of Provisional Application Ser. No. 60/058,041 filed Sep. 4, 1997.

BACKGROUND

1. Technical Field

The present invention relates generally to circuitry for driving signals onto a communication line. More particularly, the present invention relates to reducing electromagnetic interference (EMI) in such signal transmission.

2. Description of Related Art

As electronic and computer technology continues to evolve, communication of data among different devices, either situated nearby or at a distance, becomes increasingly important. It is also increasingly desirable to provide such data communications at very high speeds, especially in view of the large amount of data required for data communications in intensive data consuming systems using graphical or video information, multiple input-output channels, local area networks, and the like. Hence, it is now more desirable than ever to provide for high speed data communications among different chips on a circuit board, different circuit boards in a system, and different systems with each other.

A problem of increasing significance for such data communications is substantial electromagnetic interference (EMI) radiation, often exceeding acceptable levels. As the number of data lines and the rate of data driving and transmission increases, the EMI emitted increases correspondingly.

An early prior art method of reducing EMI radiation involves physical shielding. Physical shielding may reduce EMI radiation, but physical shielding may be cumbersome and costly, and may not be effective enough to sufficiently reduce EMI radiation depending on the frequencies involved.

SUMMARY

The above described needs and problems are satisfied and solved by the present invention. The present invention relates to the use of multiple controllable delays to reduce EMI radiated during the transmission of multiple synchronized signals. Each controllable delay introduces a controlled delay into a corresponding signal being transmitted. The controlled delay is such that the combined strength of the multiple signals at peak frequencies is substantially reduced. This results in reduced EMI radiation at those peak frequencies.

DESCRIPTION OF THE PREFERRED EMBODIMENTS

Figure 1A:
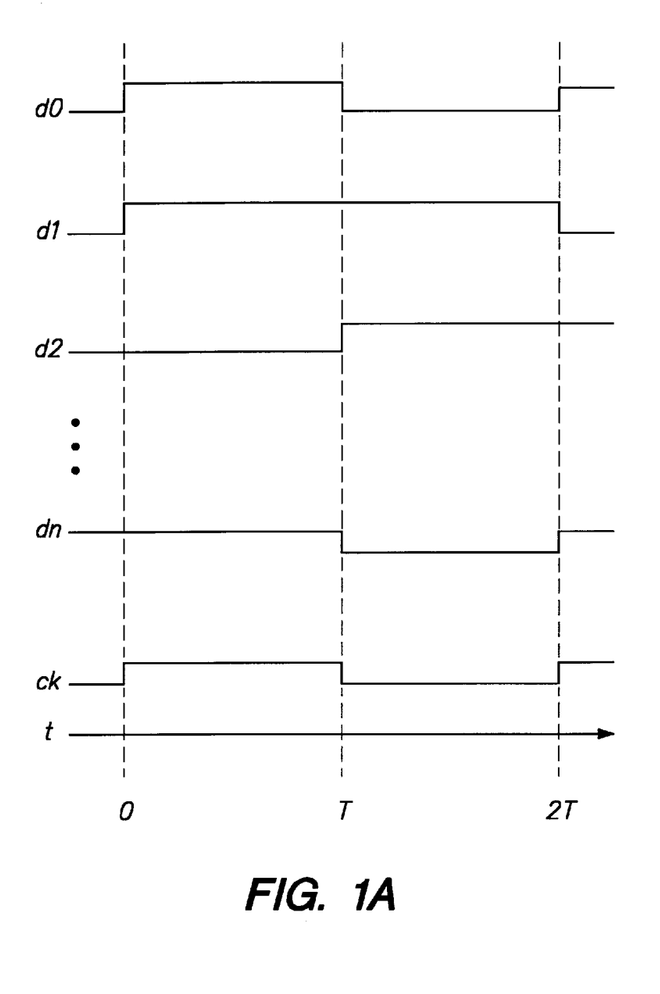
FIG. 1A is a timing diagram illustrating multiple synchronized signals from an example transmission system.

FIG. 1A is a timing diagram illustrating multiple synchronized signals from an example transmission system. The example system transmits n+1 data signals $d0(t)$, $d1(t)$, $d2(t)$, ..., $dn(t)$ and one clock signal $ck(t)$. The signals are digital and are synchronized in that they each may have transitions only at periodic points in time. In particular, they each may have transitions at times $t=0, T, 2T, 3T, ...$ While the data signals $d0, d1, d2, ..., dn$ may or may not have a transition at times $t=iT$, where i is an integer, the clock signal $ck$ always has a transition at time $t=iT$. For example, at time $t=T$, data signal $d0$ transitions from 1 (high) to 0 (low), data signal $d1$ stays the same at 1, data signal $d2$ transitions from 0 to 1, ..., data signal $dn$ transitions form 1 to 0, and clock signal $ck$ transitions from 1 to 0. One of skill in the art would, of course, understand that the signals are synchronized to be within a certain tolerance which is dependent on various technological characteristics of the particular system.

Figure 1B:
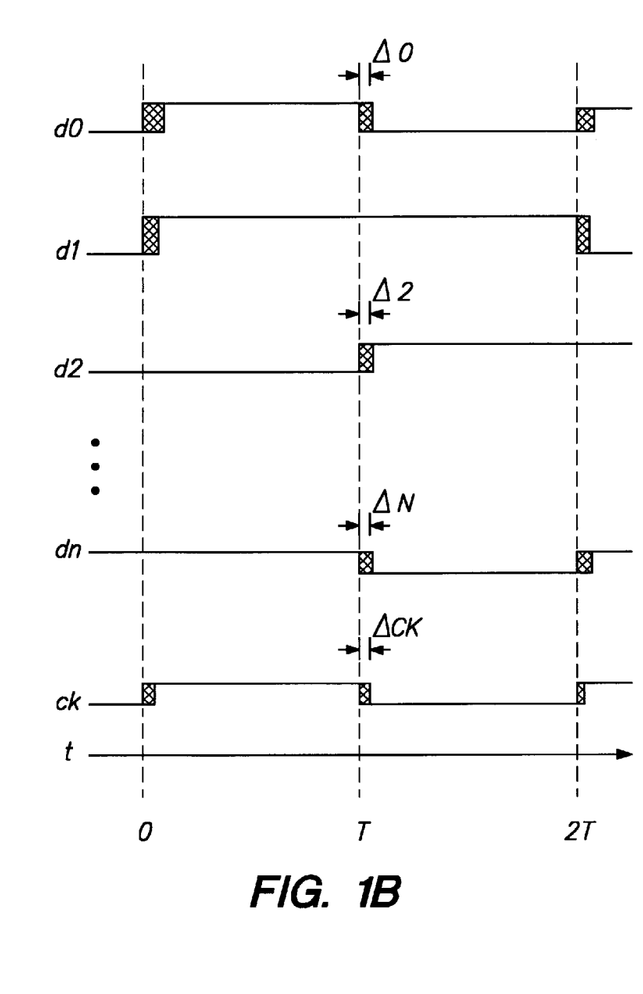
FIG. 1B is a timing diagram illustrating multiple synchronized signals from an example transmission system with controlled delays introduced into the signals in accordance with the present invention.

FIG. 1B is a timing diagram illustrating multiple synchronized signals from an example transmission system with controlled delays introduced into the signals in accordance with the present invention. Instead of the transitions being synchronized, they are "slightly out-of-sync." For example, at time $t=T$, data signal $d0$'s transition from 1 to is purposefully delayed by a controlled interval of time, labeled $\Delta 0$. Data signal $d2$'s transition from 0 to 1 is purposefully delayed by another controlled interval of time, labeled $\Delta 2$ ... Data signal $dn$'s transition from 1 to 0 is purposefully delayed by yet another interval of time, labeled $\Delta n$. Finally, clock signal $ck$'s transition is purposefuly delayed by still another controlled interval of time, labeled $\Delta ck$. Each of the controlled intervals of time are significantly less in magnitude than T, and the controlled intervals of time are generally different in length from each other such that the transitions of the various signals are generally slightly out-of-sync. The lengths of the controlled intervals of time may be generated by a pseudo-random number generator or by some other method of distributing them such that the transitions are slightly out-of-sync.

Figure 2A:
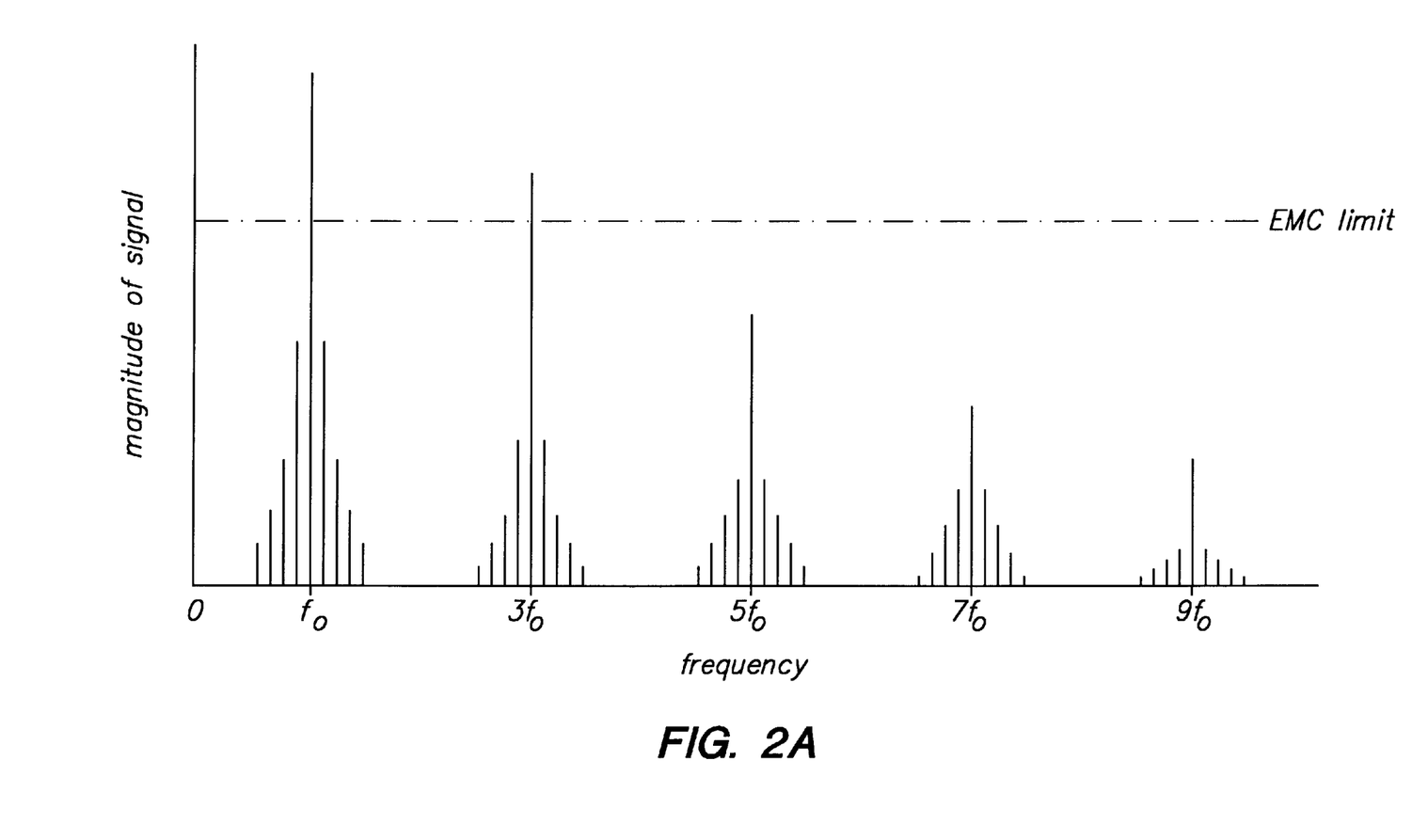
FIG. 2A is an illustrative frequency spectrum of multiple synchronized signals.

FIG. 2A is an illustrative frequency spectrum of multiple synchronized signals. The illustrative spectrum in FIG. 2A corresponds to a Fourier transformation of synchronized signals such as those illustrated in FIG. 1A. The details of such a Fourier transformation are well known to those of skill in the art. Moreover, one of skill in the art would know that the Fourier spectrum in FIG. 2A is a qualitative depiction which is not meant to be quantitatively accurate.

The spectrum in FIG. 2A has "main" peaks concentrated at fo, 3fo, 5fo, 7fo, and so on (odd multiples of fo), where fo is proportional to 1/T. These main peaks are narrow and relatively high. There are also "satellite" peaks or side lobes surrounding each of the main peaks.

The main peak at fo is the highest peak and is higher than a maximum level for electromagnetic compatibility (EMC). This maximum level is shown in FIG. 2A as the EMC limit. In the example shown in FIG. 2A, the main peak at 3fo is also higher than the EMC limit. Such peaks above the EMC limit mean that the signals are emitting an unacceptable amount of electromagnetic interference (EMI).

Figure 2B:
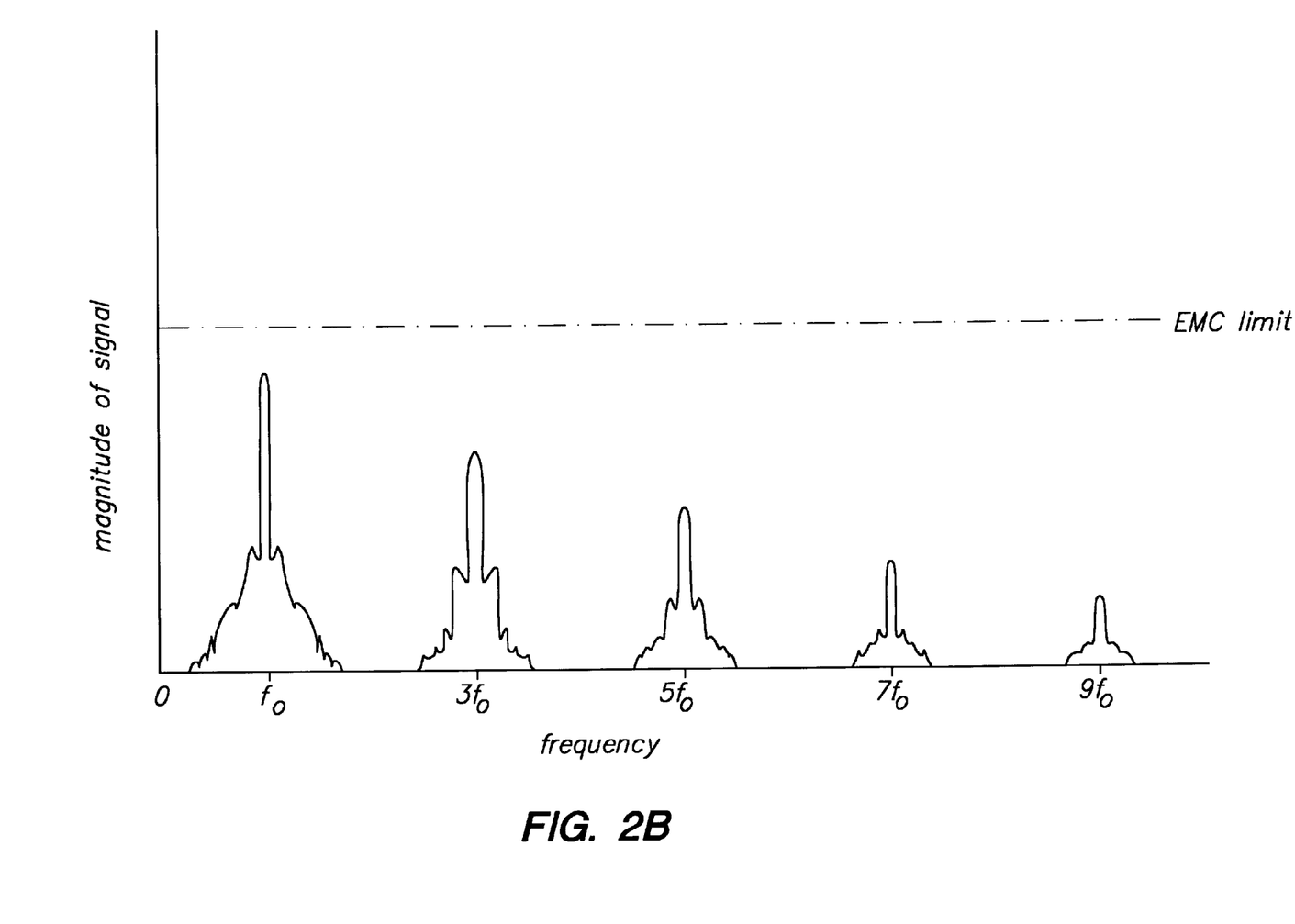
FIG. 2B is an illustrative frequency spectrum of multiple synchronized signals with randomized controlled delays introduced into the signals in accordance with the present invention.

FIG. 2B is an illustrative frequency spectrum of multiple synchronized signals with randomized controlled delays introduced into the signals in accordance with the present invention. The illustrative spectrum in FIG. 2B corresponds to a Fourier transformation of slightly out-of-sync signals such as those illustrated in FIG. 1B. The details of such a Fourier transformation are well known to those of skill in the art. Moreover, one of skill in the art would know that the Fourier spectrum in FIG. 2B is a qualitative depiction which is not meant to be quantitatively accurate.

Like the spectrum in FIG. 2A, the spectrum in FIG. 2B has "main" peaks concentrated at odd multiples of fo, where fo is proportional to 1/T. However the main peaks in FIG. 2B are broader and shorter than the main peaks in FIG. 2A. This is due to the transitions being purposefully made to be slightly out-of-sync, as illustrated by the signals in FIG. 1B. Similarly, the satellite peaks or side lobes are also broader and shorter.

In FIG. 2B, the main peak at fo is the highest peak, but it is lower than the EMC limit. Thus, the EMI emitted by the signals illustrated in FIG. 1B is reduced sufficiently to be within acceptable limits.

Figure 3:
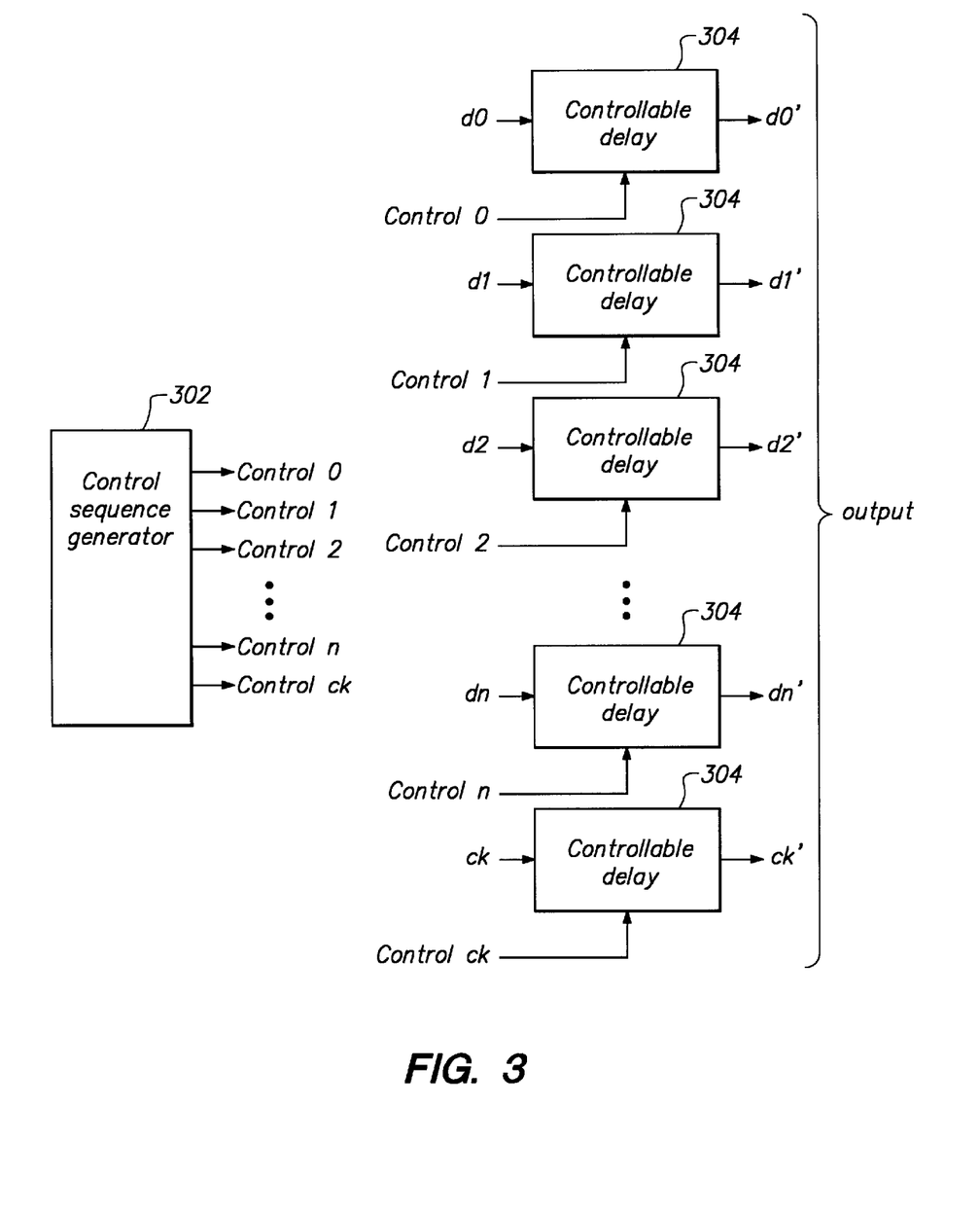
FIG. 3 is a diagram of an example transmission system according to a first embodiment of the present invention.

FIG. 3 is a diagram of an example transmission system according to a first embodiment of the present invention. The system includes a control sequence generator 302 and n+2 controllable delays 304.

The control sequence generator 302 generates n+2 control signals: control0; control1; control2; . . . ; control n; and controlck. Each of these signals control a corresponding controllable delay 304. In other words, the n+2 controllable delays 304 are placed into the n+1 data lines (d0, d1, d2, . . . , dn) and the clock line (ck) as shown in FIG. 3. For example, the data line near the top of FIG. 3 carries the data signal d0. The data signal d0 is input into a controllable delay 304. The controllable delay 304 operates on the data signal d0 such that the data signal d0 is delayed by an interval determined by control signal control0. The resultant delayed data signal is labeled d0' and is output for transmission.

Figure 4A:
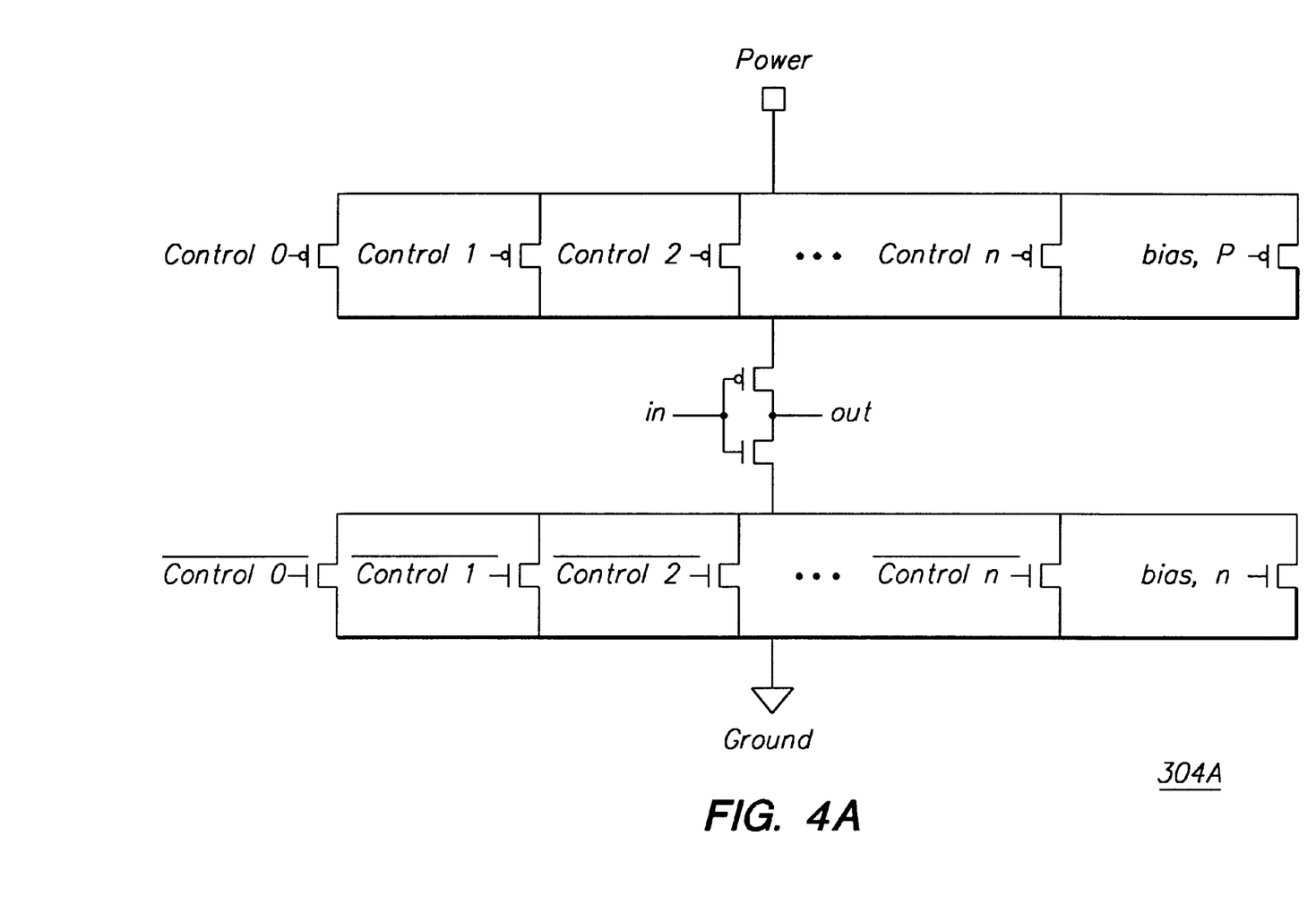
FIG. 4A is a circuit diagram of a first controllable delay 304A in accordance with the first embodiment of the present invention.

FIG. 4A is a circuit diagram of a first controllable delay 304A in accordance with the first embodiment of the present invention. The first controllable delay 304A operates digitally.

The circuit in FIG. 4A is driven by a digital random number generator. In actuality, the digital random number generator generates only pseudo random numbers (deterministic in the long-run, but not correlated locally) instead of truly random numbers. Hence, it is usually called a pseudo-random number generator.

Each signal control0, control1, . . . , controln and each corresponding inverted signal are multi-valued (more than binary) digital signals generated by the digital random number generator. Per each delay element, each of the digital signals determining the delay is a different combination of outputs from the digital random number generator. The bias,p and bias,n voltage signals allow for the range of the delay to be predetermined. Without them, the delays may be infinite, which would not be practical. These voltage signals may be levels somewhere between the power supply and ground, or bias,p may be simply grounded and bias,n may be simply connected to the power supply, depending on the range of the delays desired.

Note that the transistors in FIG. 4A are not necessarily the same sized. They could be same sized, but they can instead be, for example, binary scaled so that the second one is twice as large as the first one, the third one is four times as large as the first one, and so on.

Figure 4B:
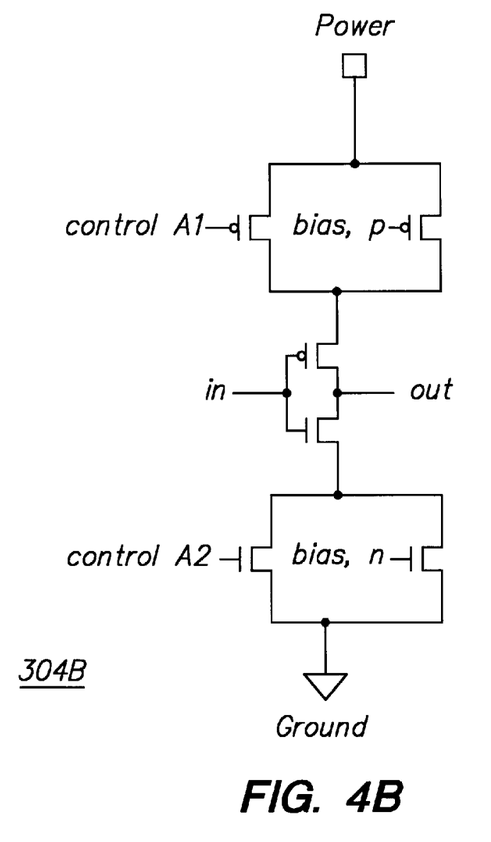
FIG. 4B is a circuit diagram of a second controllable delay 304B in accordance with the first embodiment of the present invention.

FIG. 4B is a circuit diagram of a second controllable delay 304B in accordance with the first embodiment of the present invention. The second controllable delay 304B operates in an analog manner. The circuit in FIG. 4B is driven by an analog random signal generator. The signals controlA1 and controlA2 are analog voltage signals which vary randomly. Analog random signal generation techniques are known in the art. Examples of which may be based on thermal noise generation or chaos circuits. The bias,p and bias,n voltage signals serve the same purpose as they do for the circuit in FIG. 4A.

Figure 4C:
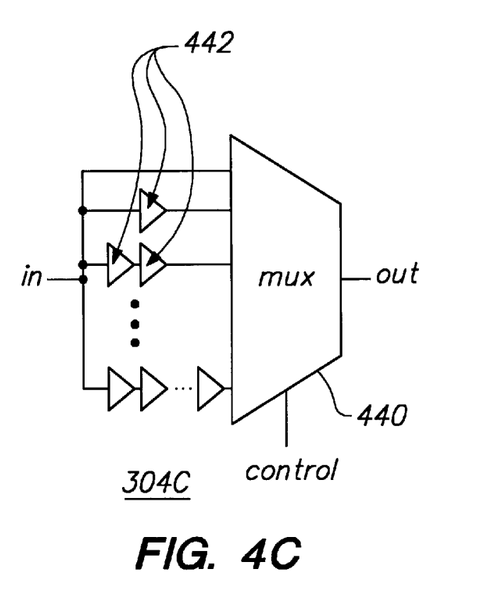
FIG. 4C is a circuit diagram of a third controllable delay 304C in accordance with the first embodiment of the present invention.

FIG. 4C is a circuit diagram of a third controllable delay 304C in accordance with the first embodiment of the present invention. Like the first controllable delay 304A, the third controllable delay 304C operates digitally. The third controllable delay 304C includes a multiplexer (MUX) 440 which selects between several delayed versions of the input signal (in). The selection is made based upon a control signal (control) and is output as the delayed signal (out). The several delayed versions are generated by several lines in parallel, each with a different number of delay elements 442.

Figure 4D:
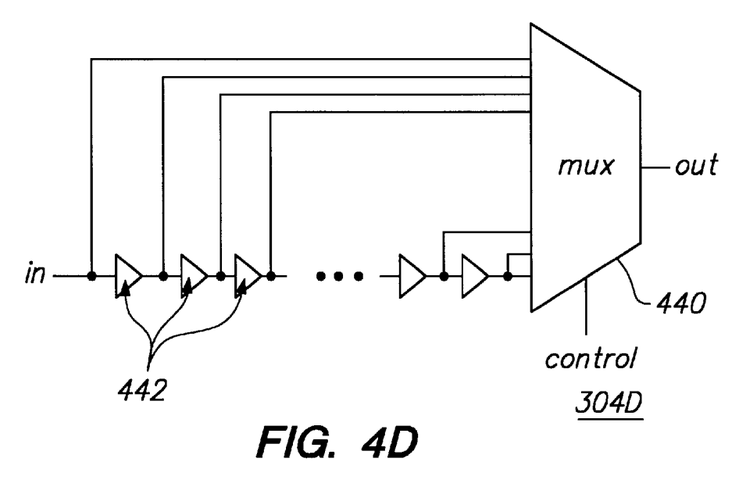
FIG. 4D is a circuit diagram of a fourth controllable delay 304D in accordance with the first embodiment of the present invention.

FIG. 4D is a circuit diagram of a fourth controllable delay 304D in accordance with the first embodiment of the present invention. The fourth controllable delay 304D operates digitally. Similar to the third controllable delay 304C, the fourth controllable delay 304D includes a multiplexer (MUX) 440 which selects between several delayed versions of the input signal (in). The selection is made based upon a control signal (control) and is output as the delayed signal (out). However, the fourth controllable delay 304D uses less delay elements 442 than the third controllable delay 304C does. This is done by chaining several delay elements 442 in series and tapping into different points in the serial chain to derive different delays.

Figure 5A:
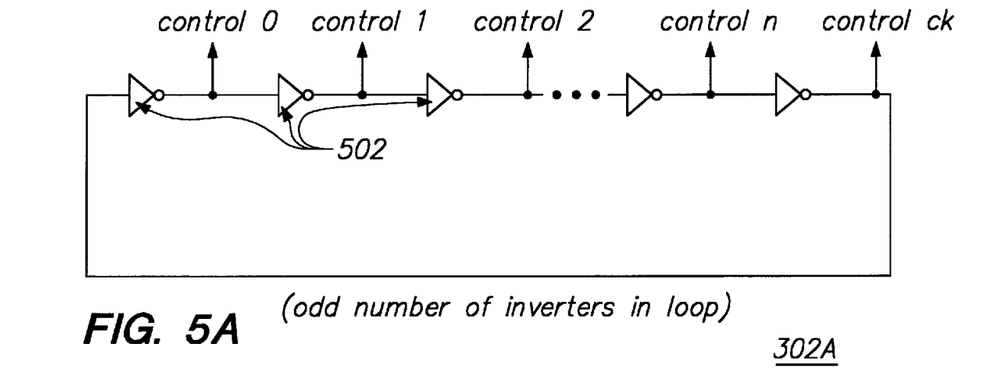
FIG. 5A is a circuit diagram of a first control signal generator 302A in accordance with the first embodiment of the present invention.

FIG. 5A is a circuit diagram of a first control signal generator 302A in accordance with the first embodiment of the present invention. The first control signal generator 302A comprises a ring oscillator and generates control signals that result in well-spaced transitions that do not occur at the same time, but the transitions are not randomized.

The first control signal generator 302A includes an odd number of inverters connected in a loop. (If a differential delay element is used, an even number of inverters can make a ring oscillator as well.) Such a loop of inverters operate as an oscillator with particular voltage and timing characteristics. The outputs of the inverters 502 comprise the control signals (control0, control1, control2 . . . , controln, and controlck).

One of skill in the art is familiar with such ring oscillators. Each of the inverters has very similar characteristics in comparison with the other inverters. Since the inverters are very similar in their characteristics, the signal supplied to each inverter goes through a very similar delay. Hence, the signals generated by the inverters may be called well spaced. Such signals are useful for random signal generation because the oscillation frequency of the ring oscillator is not synchronous to the system clock. Hence, the pseudo-random signals may be generated. Different combinations of these pseudo-random signals will be used to control the delay elements.

Figure 5B:
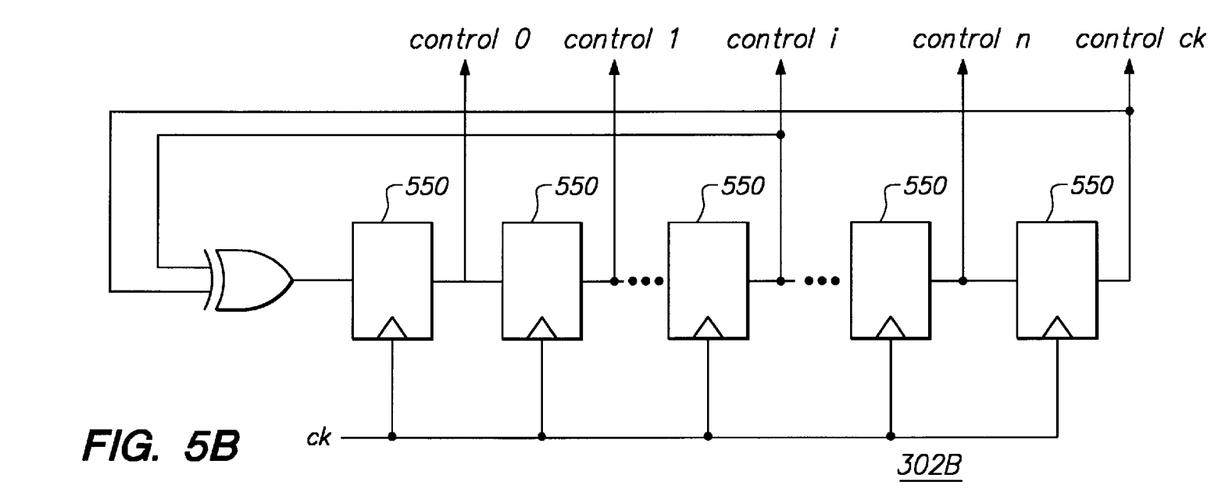
FIG. 5B is a circuit diagram of a second control signal generator 302B in accordance with the first embodiment of the present invention.

FIG. 5B is a circuit diagram of a second control signal generator 302B in accordance with the first embodiment of the present invention. The second control signal generator 302B comprises a pseudo-random sequence generator and generates control signals that result in well-randomized transitions that generally do not occur at the same time.

The second control signal generator 302B includes several one-bit registers 550 connected serially and controlled by a clock signal such that the bits in the registers shift from one register 550 to the next depending on the clock signal. The outputs of the registers 550 comprise the control signals (control0, control1, control2, . . . , controln, and controlck). In addition, the outputs of certain of the registers 550 are fed back to the first register 550 in the serial chain. In the example circuit shown in FIG. 5B, the output of two particular registers 550 (that generate the controli and controlck signals) are XORed (an exclusive-or operation is applied to them) and the result is fed back to the beginning of the register chain. One of skill in the art is familiar with such pseudo-random number generators.

Figure 6:
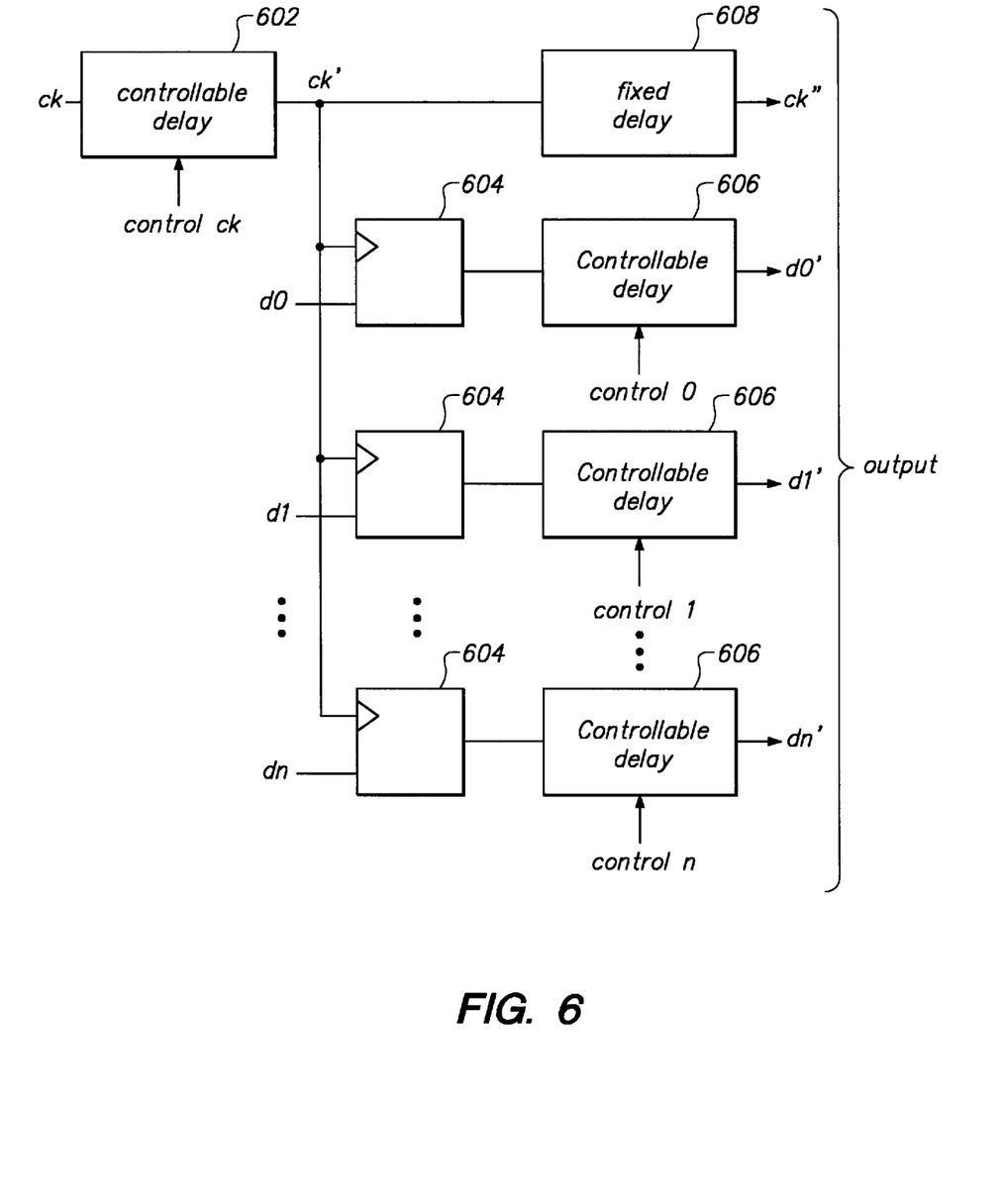
FIG. 6 is a diagram of an example transmission system according to a second embodiment of the present invention.

FIG. 6 is a diagram of an example transmission system according to a second embodiment of the present invention. In this embodiment, the controlck signal is such that the controllable delay 602 introduced into the clock signal ck is randomized. The resultant randomized clock signal is labeled ck'

The data signals d0, d1, d2, . . . , dn are each latched by ck' using latches or registers 604. Subsequently, a controllable delay 606 is introduced into each of the data signals (d0, d1, d2, . . . , dn), where each of the controllable delays 606 is controlled by a corresponding control signal (control0, control1, control2, . . . , controln). Finally, a fixed delay 608 is introduced into the randomized clock signal so that the randomized clock ck' is further delayed to produce delayed randomized clock ck". The length of time of the fixed delay 608 is set to be the average values of the controlled delays 606 for the data signals d0, d1, d2, . . . , dn.

This second embodiment in FIG. 6 introduces more randomization than the first embodiment in FIG. 3. Furthermore, the second embodiment preserves clocking parameters such as set-up and hold times.

An alternative technique would involve frequency modulation of the system clock signal. Such frequency modulation of the system clock may be called clock dithering. Unwanted EMI may also be reduced by using clock dithering.

However, using clock dithering to reduce EMI has several disadvantages. First, clock dithering effectively increases the setup and hold times (the time intervals that inputs must be stable before and after the clock edge) required for all clocked registers in the integrated circuit chip. Second, using clock dithering to reduce EMI adversely affects overall performance of the integrated circuit chip.

In contrast, the embodiments shown in FIG. 3 and FIG. 6 have major advantages over clock dithering. First, setup and hold times for clocked registers not related to data input/output (data I/O) are not generally affected. Second, the overall performance of the chip is not impacted, only the performance of the data I/O. Other advantages include the ability to add a disable feature such that the EMI reduction for the data I/O may be switched on or off without affecting the rest of the chip.

What is claimed is:

1. A device for transmitting multiple synchronized signals with reduced electromagnetic interference at a peak frequency comprising:

a first transmission line for carrying a first digital signal having a minimum time T between transitions;

a first controllable delay coupled to the first transmission line and adapted to delay the first digital signal by a first controlled interval of time to produce a first delayed digital signal, said first controlled interval of time being significantly less than T;

a second transmission line for carrying a second digital signal, said second transmission line being in close proximity to said first transmission line, and said second digital signal having the same minimum time T between transitions and being synchronized with the first digital signal;

a second controllable delay coupled to the second transmission line and adapted to delay the second digital signal by a second controlled interval of time to produce a second delayed digital signal, said second controlled interval of time being significantly less than T and being different from said first controlled interval of time;

a third transmission line for carrying a third digital signal, said third transmission line being in close proximity to the first and second transmission lines, and said third digital signal having the same minimum time T between transitions and being synchronized with said first and second digital signals; and a third controllable delay coupled to the third transmission line and adapted to delay the third digital signal by a third controlled interval of time to produce a third delayed digital signal, said third controlled interval of time being significantly less than T and being different from said first and second controlled intervals of time, wherein the first, second, and third controlled intervals of time are generally different from each other such that the transitions of the first, second, and third delayed digital signals are slightly out-of-sync.

2. The device of claim 1, wherein the first digital signal is a periodic clock signal, and the second and third digital signals are data signals.

3. The device of claim 1 further comprising a pseudo random sequence generator for generating a first control signal for controlling the first controllable delay, a second control signal for controlling the second controllable delay, and a third control signal for controlling the third controllable delay; and further wherein the peak frequency is proportional to 1/T, and the electromagnetic interference radiated at the peak frequency during transmission of the digital signals is reduced.

4. The device of claim 3, wherein the pseudo-random sequence generator comprises a plurality of one-bit registers coupled serially.

5. The device of claim 1, wherein the first and second controllable delays are digital.

6. A method for generating and transmitting multiple synchronized signals with reduced electromagnetic interference at a peak frequency comprising:

delaying a first digital signal having a minimum time T between transitions by a first controlled interval of time, said first controlled interval of time being significantly less than T, to produce a first delayed digital signal.

delaying a second digital signal having the same minimum time T between transitions and being synchronized with the first digital signal by a second controlled interval of time, said second controlled interval of time being significantly less than T and differing from said first controlled interval of time, to produce a second delayed digital signal;

delaying a third digital signal having the same minimum time T between transitions and being synchronized with the first and second digital signals by a third controlled interval of time, said third controlled interval of time being significantly less than T and differing from said first and second controlled intervals of time, to produce a third delayed digital signal, wherein the first, second, and third controlled intervals of time are generally different from each other such that the transitions of the first, second, and third delayed digital signals are slightly out-of-sync.

7. The method of claim 6, wherein the first digital signal is a periodic clock signal, and the second and third digital signals are data signals.

8. The method of claim 6, wherein the steps of delaying the first, second and third digital signals are accomplished by using a pseudo-random sequence generator.

9. The method of claim 8, wherein the pseudo-random sequence generator comprises a plurality of one-bit registers coupled serially.

10. The method of claim 6, wherein the first, second and third controllable delays are digital.

* * * * *